US012666396B2

(12) United States Patent
Yamamoto et al.

(10) Patent No.: US 12,666,396 B2
(45) Date of Patent: Jun. 23, 2026

(54) USER EQUIPMENT, NETWORK NODE, AND BASE STATION

(71) Applicants: DENSO CORPORATION, Kariya City (JP); TOYOTA JIDOSHA KABUSHIKI KAISHA, Toyota (JP)

(72) Inventors: Tomoyuki Yamamoto, Kariya City (JP); Hideaki Takahashi, Kariya City (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/349,644

(22) Filed: Jul. 10, 2023

(65) Prior Publication Data

US 2023/0354265 A1     Nov. 2, 2023

Related U.S. Application Data

(63) Continuation of application No. PCT/JP2021/045586, filed on Dec. 10, 2021.

(30) Foreign Application Priority Data

Jan. 13, 2021     (JP) ................................. 2021-003643

(51) Int. Cl.
*H04W 68/02* (2009.01)
*H04W 68/12* (2009.01)
*H04W 88/06* (2009.01)

(52) U.S. Cl.
CPC ........... *H04W 68/02* (2013.01); *H04W 68/12* (2013.01); *H04W 88/06* (2013.01)

(58) Field of Classification Search
None
See application file for complete search history.

(56) References Cited

U.S. PATENT DOCUMENTS

2017/0325130 A1     11/2017     Purohit et al.
2020/0305118 A1     9/2020     Ryu et al.
(Continued)

FOREIGN PATENT DOCUMENTS

JP     2022108426 A     7/2022
JP     2022108605 A     7/2022
(Continued)

OTHER PUBLICATIONS

U.S. Appl. No. 18/349,423, filed Jul. 10, 2023, Yamamoto et al.
(Continued)

*Primary Examiner* — Frantz Bataille
(74) *Attorney, Agent, or Firm* — Harness, Dickey & Pierce, PLC

(57) ABSTRACT

A user equipment according to an aspect of the present disclosure, which communicates with a plurality of mobile networks using a plurality of subscriber identity modules, includes: a memory storing a program; and one or more processors configured to execute the program to: receive a paging message from a first mobile network; transmit in response to the paging message, to an AMF (Access and Mobility Management Function), a SERVICE REQUEST message including a first information element indicating that the user equipment does not prefer to receive the paging message from the first mobile network and a second information element indicating that the paging message is not transmitted except for a voice service in a case where the user equipment determines to not prefer to receive the paging message from the first network; and receive the paging message only for the voice service in a case where the first information element and the second information element is transmitted.

10 Claims, 13 Drawing Sheets

1

(56) References Cited

U.S. PATENT DOCUMENTS

| | | | | |
|---|---|---|---|---|
| 2021/0120461 A1* | 4/2021 | Chong | .............. | H04W 36/0033 |
| 2021/0289579 A1* | 9/2021 | Ke | .................... | H04W 36/0033 |
| 2022/0191824 A1 | 6/2022 | Kumar et al. | | |
| 2022/0312368 A1* | 9/2022 | Zhang | .................. | H04W 48/18 |

FOREIGN PATENT DOCUMENTS

| | | |
|---|---|---|
| JP | 2022108671 A | 7/2022 |
| WO | WO-2020209620 A1 | 10/2020 |
| WO | WO-2020247043 A1 | 12/2020 |

OTHER PUBLICATIONS

U.S. Appl. No. 18/349,582, filed Jul. 10, 2023, Yamamoto et al.
International Search Report regarding International Patent Application No. PCT/JP2021/045586, dated Jan. 11, 2022.

3GPP TR 23.761 V1.2.0 (Nov. 2020) 3rd Generation Partnership Project; Technical Specification Group Services and System Aspects; Study on system enablers for devices having multiple Universal Subscriber Identity Modules (USIM) (Release 17).
3GPP TSG-RAN WG2 Meeting #112e, R2-2009325, Online Nov. 2-13, 2020, vivo, E-mail discussion: [Post111-e][917][Multi-SIM] Multi-Sim (vivo).
3GPP TSG-RAN WG2 Meeting #112 Electronic, R2-2009265, Elbonia, Nov. 2-13, 2020, Nokia, Nokia Shanghai Bell, "Scenarios and Impact analysis for Switching Notification".
SA WG2 Meeting #140E (E-meeting), S2-2006012, Aug. 19-Sep. 2, 2020, Elbonia, Sony, Samsung, "KI #1, Sol #3: Update to clarify".
SA WG2 Meeting #140E, S2-2006014, Aug. 19-Sep. 1, 2020, Elbonia, Oppo, "KI#1, Sol#11 Update to clarify UE can accept paging when timer expires".

* cited by examiner

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| | Allowed access categories | Allowed access categories 9.11.3.XX | O | | |

FIG.10
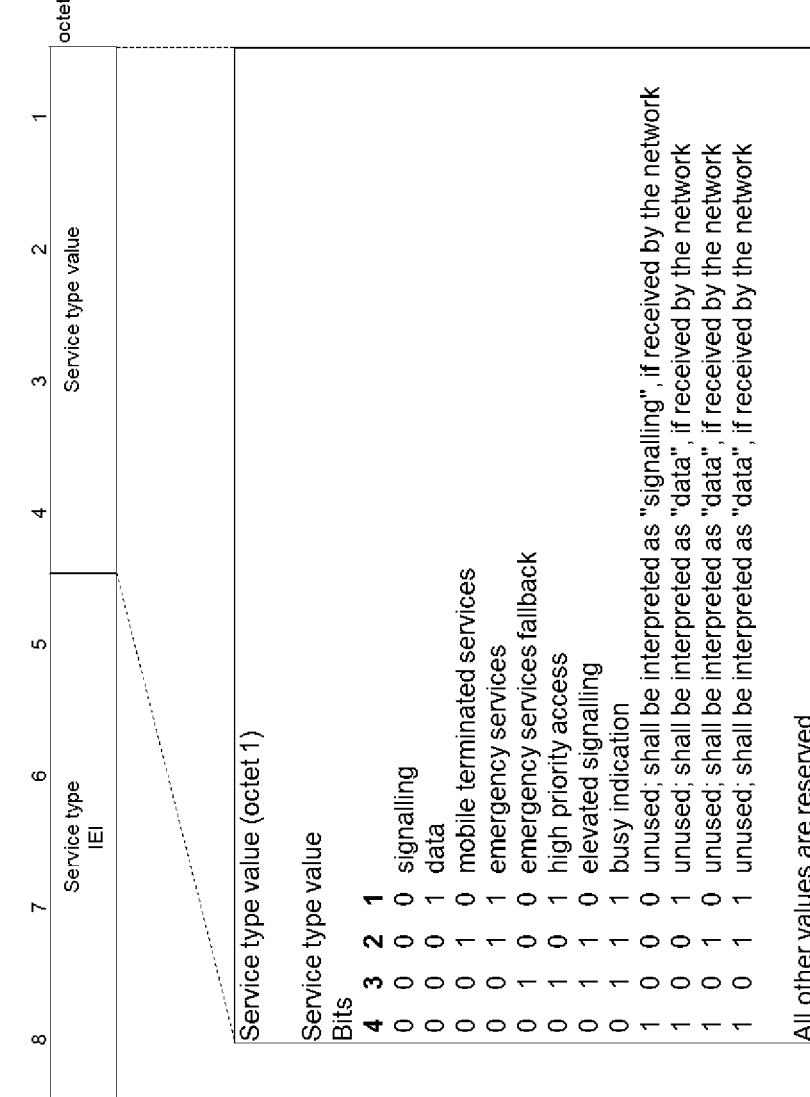

FIG.11

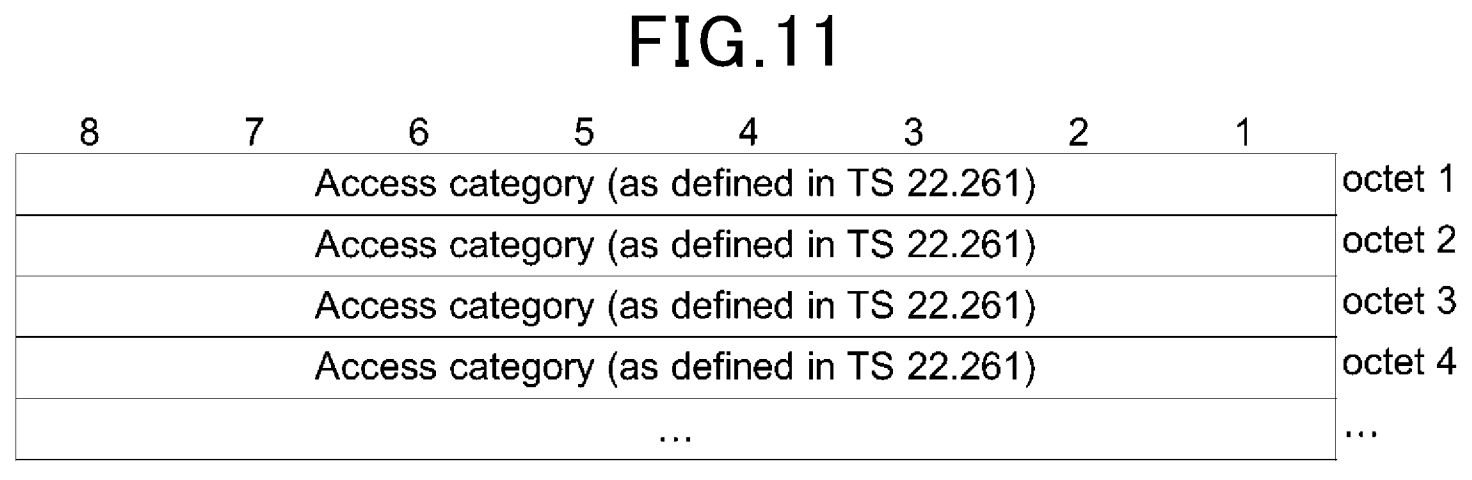

| | 8 | 7 | 6 | 5 | 4 | 3 | 2 | 1 | |
|---|---|---|---|---|---|---|---|---|---|
| Access category (as defined in TS 22.261) | | | | | | | | | octet 1 |
| Access category (as defined in TS 22.261) | | | | | | | | | octet 2 |
| Access category (as defined in TS 22.261) | | | | | | | | | octet 3 |
| Access category (as defined in TS 22.261) | | | | | | | | | octet 4 |
| ... | | | | | | | | | ... |

FIG.12

| Access Category number | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | MO signalling on NAS level resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8 | All except for the conditions in Access Category 1 | MO signalling on RRC level resulting from other than paging |
| 9 | All except for the conditions in Access Category 1 | MO IMS registration related signalling |
| 10 | All | MO exception data |
| 11-31 | | Reserved standardized Access Categories |
| 32-63 | All | Based on operator classification |

USER EQUIPMENT, NETWORK NODE, AND BASE STATION

CROSS-REFERENCE TO RELATED APPLICATIONS

This application is based on and claims the benefit of priority from Japanese Patent Application No. 2021-003643, filed on Jan. 13, 2021, the entire content of which is incorporated herein by reference.

BACKGROUND

1. Technical Field

The present disclosure relates to a user equipment, a network node, and a base station.

2. Related Art

In 3rd Generation Partnership Project (3GPP) Release 17, a work item has been launched for formulating functions to monitor for information of incoming call (for example, voice or data) from multiple telecommunications operators' networks for devices equipped with multiple subscriber identity module (SIM) cards.

SUMMARY

A user equipment according to an aspect of the present disclosure, which communicates with a plurality of mobile networks using a plurality of subscriber identity modules, includes: a memory storing a program; and one or more processors configured to execute the program to: receive a paging message from a first mobile network; transmit in response to the paging message, to an AMF (Access and Mobility Management Function), a SERVICE REQUEST message including a first information element indicating that the user equipment does not prefer to receive the paging message from the first mobile network and a second information element indicating that the paging message is not transmitted except for a voice service in a case where the user equipment determines to not prefer to receive the paging message from the first network; and receive the paging message only for the voice service in a case where the first information element and the second information element is transmitted.

A network node within a core network according to an aspect of the present disclosure, includes: a memory storing a program; and one or more processors configured to execute the program to: transmit, to a base station, a paging message to a user equipment which communicates with a plurality of mobile networks using a plurality of subscriber identity modules; receive, from the user equipment, a SERVICE REQUEST message including a first information element indicating that the user equipment does not prefer to receive the paging message from the first network and a second information element indicating that the paging message is not transmitted except for a voice service; and transmit the paging message only for the voice service in a case where the first information element and the second information element is received.

A base station according to an aspect of the present disclosure includes: a memory storing a program; and one or more processors configured to execute the program to: transmit a paging message to a user equipment which communicates with a plurality of mobile networks using a plurality of subscriber identity modules; receive in response to the paging message, a SERVICE REQUEST message including a first information element indicating that the user equipment does not prefer to receive the paging message from the first network and a second information element indicating that the paging message is not transmitted except for a voice service; and transmit a NAS (non-access stratum) message to a network node within a core network.

BRIEF DESCRIPTION OF THE DRAWINGS

FIG. 9 is a diagram illustrating an example of the content of a SERVICE REQUEST message according to the embodiment of the present disclosure.

FIG. 10 is a diagram illustrating an example of the content of Service Type included in the SERVICE REQUEST message according to the embodiment of the present disclosure.

FIG. 11 is a diagram illustrating an example of the content of Allowed Access Categories included in the SERVICE REQUEST message according to the embodiment of the present disclosure.

FIG. 12 is a diagram illustrating an example of access categories according to the embodiment of the present disclosure.

DETAILED DESCRIPTION OF THE PREFERRED EMBODIMENTS

Figure 1:
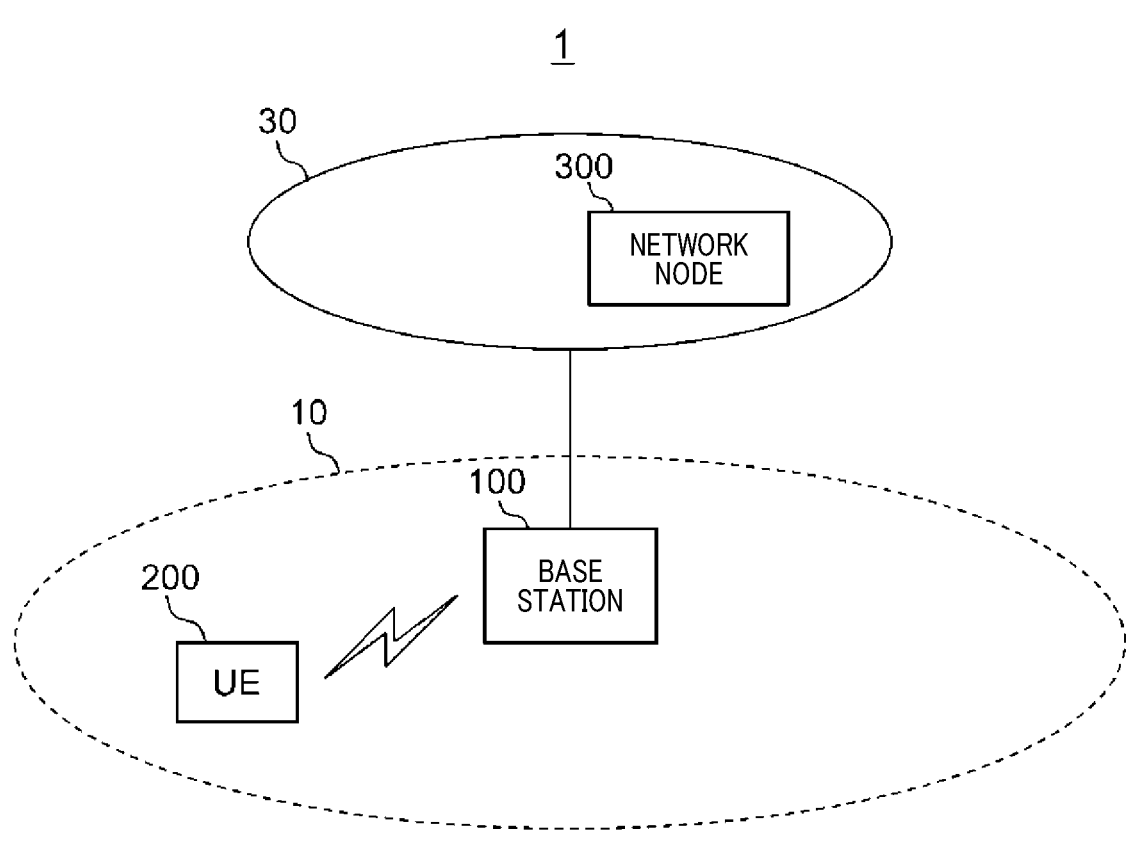
FIG. 1 is an explanatory diagram illustrating an example of a schematic configuration of a system according to an embodiment of the present disclosure.

For example, 3GPP TR 23.761 V1.2.0 (2020-11), R2-2009325 and R2-2009265 describe that, when a user equipment (UE) communicating in a certain network receives a paging message in a further network, the UE transmits a busy indication to an access and mobility management function (AMF) of the further network.

According to 3GPP TR 23.761 V1.2.0 (2020-11), in response to the busy indication, the AMF stops escalation and repetition of a paging that has triggered the busy indication. A detailed study by the inventors has revealed an issue that, in a case where the AMF stops all the subsequent pagings to a UE in response to receiving the busy indication, even if there is important incoming call information for the UE, the UE will not be able to know the presence of the important incoming call information. In addition, the inventors have revealed an issue that, in a case where the AMF stops only the paging that has triggered the busy indication but not the subsequent pagings in response to receiving the busy indication, unnecessary pagings might be repeated.

An object of the present disclosure is to provide a user equipment, a network node, and a base station that make it possible to perform an important paging while reducing unnecessary pagings.

A user equipment according to an aspect of the present disclosure includes: a reception processing unit configured to receive a paging message transmitted by a base station; and a transmission processing unit configured to transmit, in response to the paging message, busy information indicating that the user equipment is busy and exceptional service information indicating a service for which a paging is exceptionally allowed.

A network node within a core network according to an aspect of the present disclosure includes: a transmission processing unit configured to transmit, to a base station, a message for a paging to a user equipment; and a reception processing unit configured to receive busy information and exceptional service information transmitted by the user equipment in response to a paging message transmitted by the base station in response to the message. The busy information indicates that the user equipment is busy, and the exceptional service information indicates a service for which a paging is exceptionally allowed.

A base station according to an aspect of the present disclosure includes: a transmission processing unit configured to transmit a paging message; and a reception processing unit configured to receive busy information and exceptional service information transmitted by a user equipment in response to the paging message. The busy information indicates that the user equipment is busy, and the exceptional service information indicates a service for which a paging is exceptionally allowed.

The present disclosure makes it possible to perform an important paging while reducing unnecessary pagings. Note that, instead of or in addition to this advantageous effect, the present disclosure may yield another advantageous effect.

Hereinafter, an embodiment of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:
1. Configuration of System
2. Configuration of Base Station
3. Configuration of User Equipment
4. Configuration of Network Node
5. Operation Examples
6. Modification Examples

1. Configuration of System

An example of a configuration of a system 1 according to the embodiment of the present disclosure will be described with reference to FIG. 1. Referring to FIG. 1, the system 1 includes a base station 100, a user equipment (UE) 200, and a core network 30. The core network 30 includes a network node 300.

For example, the system 1 is a system compliant with technical specifications (TSs) in 3rd Generation Partnership Project (3GPP). More specifically, for example, the system 1 is a system compliant with TSs of 5G or new radio (NR). Naturally, the system 1 is not limited to this example.

(1) Base Station 100

The base station 100 is a node in a radio access network (RAN) and communicates with a UE (for example, a UE 200) located within a coverage area 10 of the base station 100.

For example, the base station 100 communicates with a UE (for example, the UE 200) using a RAN protocol stack. For example, the protocol stack includes a radio resource control (RRC) layer, a service data adaptation protocol (SDAP) layer, a packet data convergence protocol (PDCP) layer, a radio link control (RLC) layer, a medium access control (MAC) layer, and a physical (PHY) layer. Alternatively, the protocol stack may include some, but not all, of these layers.

For example, the base station 100 is a gNB. The gNB is a node that provides NR user plane and control plane protocol terminations towards a UE and is connected to the 5G core network (5GC) via an NG interface. Alternatively, the base station 100 may be an en-gNB.

The base station 100 may include a plurality of nodes. The plurality of nodes may include a first node that hosts higher layers included in the protocol stack, and a second node that hosts lower layers included in the protocol stack. The higher layers may include the RRC layer, the SDAP layer, and the PDCP layer, while the lower layers may include the RLC layer, the MAC layer, and the PHY layer. The first node may be a central unit (CU), and the second node may be a distributed unit (DU). Note that the plurality of nodes may include a third node that performs lower processing of the PHY layer, and the second node may perform higher processing of the PHY layer. The third node may be a radio unit (RU).

Alternatively, the base station 100 may be one of the plurality of nodes, and may be connected to another unit of the plurality of nodes.

The base station 100 may be an integrated access and backhaul (IAB) donor or an IAB node.

(2) UE 200

The UE 200 communicates with a base station. For example, the UE 200 communicates with the base station 100 when being located within the coverage area 10 of the base station 100.

For example, the UE 200 communicates with a base station (for example, the base station 100) using the protocol stack.

In particular, the UE 200 is capable of being equipped with two or more SIM cards. That is, the UE 200 is a multi-SIM UE or a multi-SIM device. The UE 200 is capable of communicating in two or more mobile networks respectively corresponding to the two or more SIM cards.

For example, the UE 200 can communicate in a mobile network (hereinafter, referred to as "first mobile network") that corresponds to one of the two or more SIM cards and includes the base station 100 and the network node 300. Further, the UE 200 can communicate in a mobile network (hereinafter, referred to as "second mobile network") that corresponds to another of the two or more SIM cards.

Figure 2:
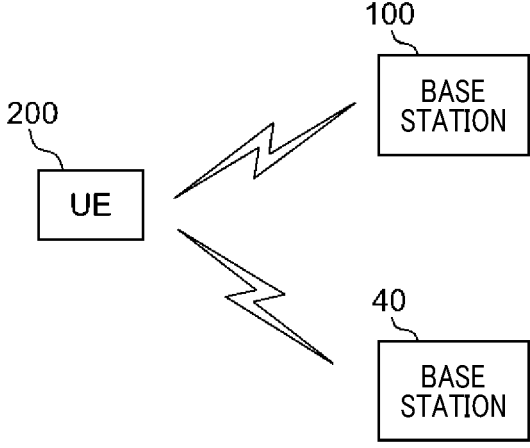
FIG. 2 is an explanatory diagram for explaining an example of a case where a user equipment according to the embodiment of the present disclosure is equipped with two SIM cards.

Referring to the example of FIG. 2, for example, the UE 200 can communicate in the first mobile network including the base station 100 and in the second mobile network including a base station 40. For example, the UE 200 may be in an RRC idle state or RRC inactive state in the first mobile network and in an RRC connected state in the second mobile network. In such a case, for example, the UE 200 may receive a paging message transmitted by the base station 100 in the first mobile network while communicating with the base station 40 in the second mobile network.

(3) Network Node 300

The network node 300 is a network function of the core network 30. For example, the network node 300 is an access and mobility management function (AMF).

2. Configuration of Base Station

Figure 3:
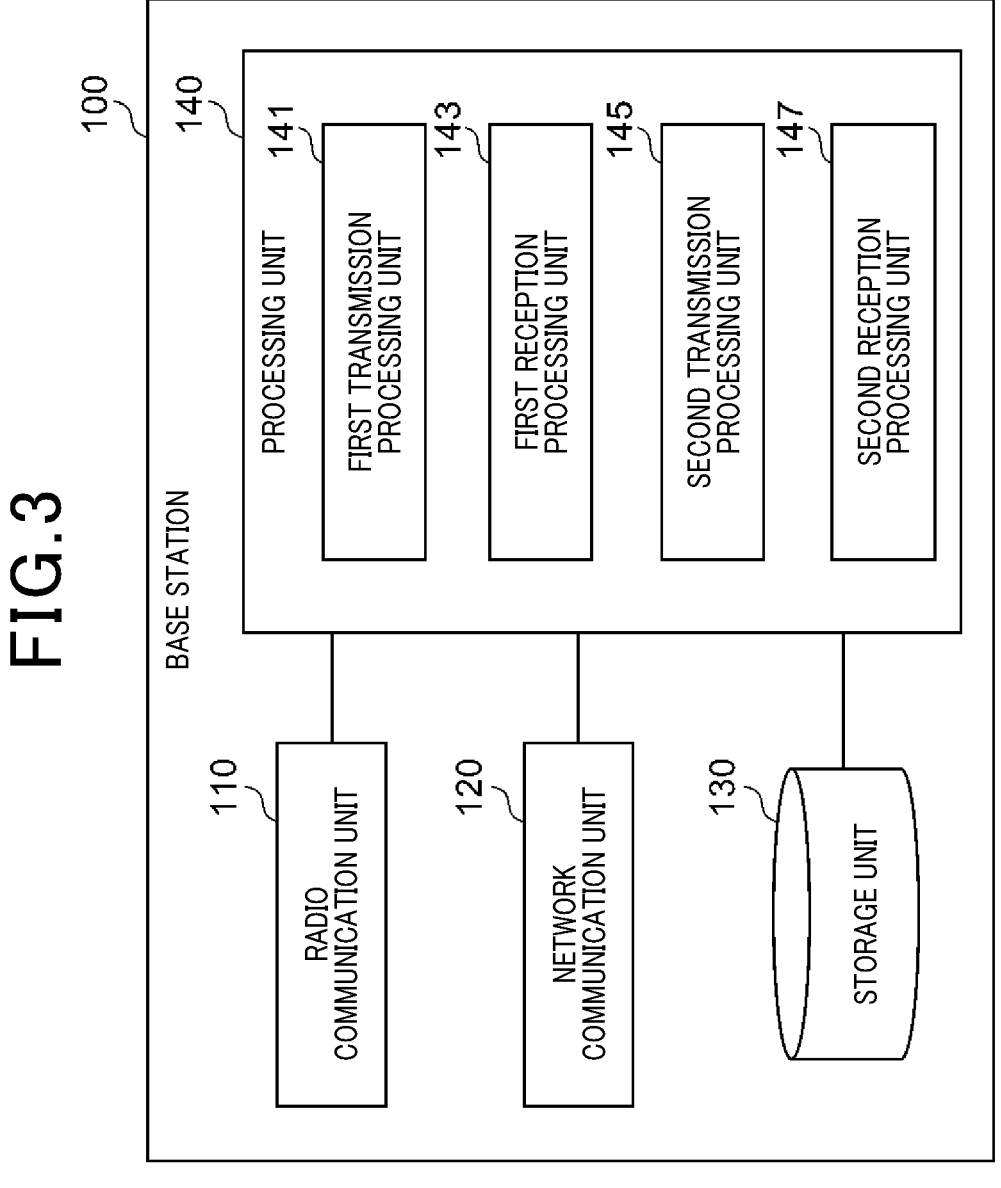
FIG. 3 is a block diagram illustrating an example of a schematic functional configuration of a base station according to the embodiment of the present disclosure.
Figure 4:
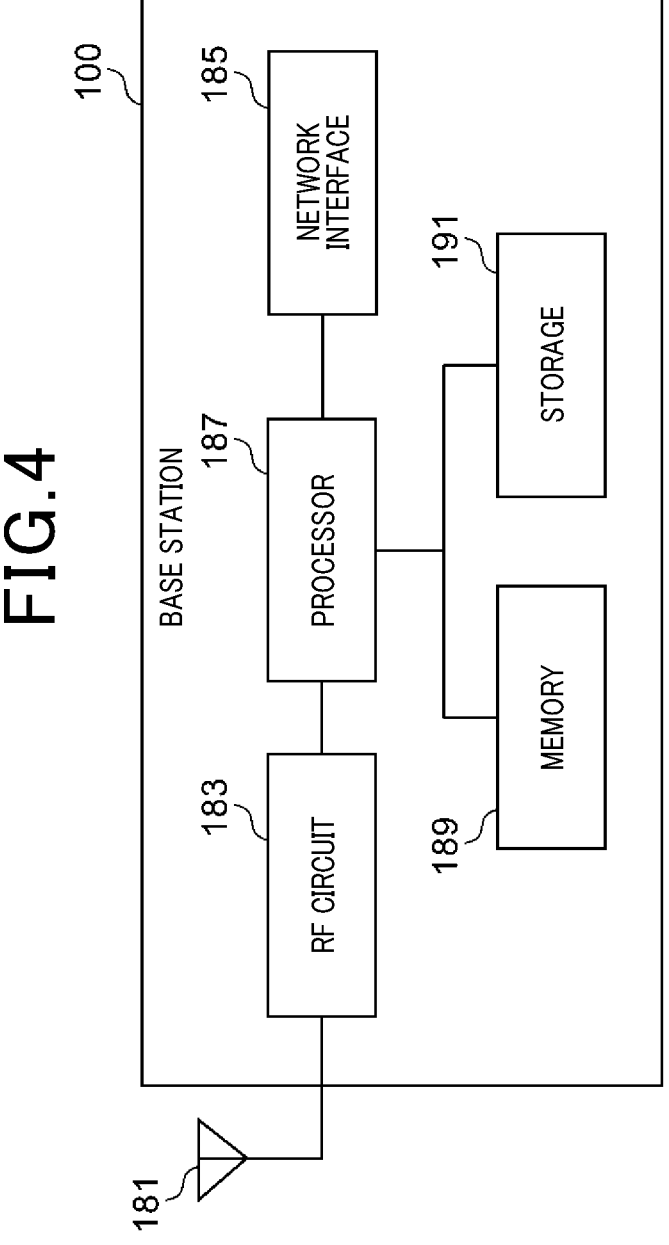
FIG. 4 is a block diagram illustrating an example of a schematic hardware configuration of the base station according to the embodiment of the present disclosure.

A configuration example of the base station 100 according to the embodiment of the present disclosure will be described with reference to FIGS. 3 and 4.

(1) Functional Configuration

First, a functional configuration example of the base station 100 according to the embodiment of the present disclosure will be described with reference to FIG. 3. Referring to FIG. 3, the base station 100 includes a radio communication unit 110, a network communication unit 120, a storage unit 130, and a processing unit 140.

The radio communication unit 110 wirelessly transmits and receives signals. For example, the radio communication unit 110 receives signals from and transmits signals to a UE.

The network communication unit 120 receives signals from and transmits signals to the network.

The storage unit 130 stores various information.

The processing unit 140 provides various functions of the base station 100. The processing unit 140 includes a first transmission processing unit 141, a first reception processing unit 143, a second transmission processing unit 145, and a second reception processing unit 147. Note that the processing unit 140 may further include a component other than these components. That is, the processing unit 140 may also perform an operation other than operations of these components. Specific operations of the first transmission processing unit 141, the first reception processing unit 143, the second transmission processing unit 145, and the second reception processing unit 147 will be described in detail later.

For example, the processing unit 140 (the first transmission processing unit 141 and the first reception processing unit 143) communicates with a UE (for example, the UE 200) via the radio communication unit 110. For example, the processing unit 140 (the second transmission processing unit 145 and the second reception processing unit 147) communicates with other nodes (for example, the network node 300 within the core network 30 or another base station) via the network communication unit 120.

(2) Hardware Configuration

Next, a hardware configuration example of the base station 100 according to the embodiment of the present disclosure will be described with reference to FIG. 4. Referring to FIG. 4, the base station 100 includes an antenna 181, an RF circuit 183, a network interface 185, a processor 187, a memory 189, and a storage 191.

The antenna 181 converts signals into radio waves and emits the radio waves into the air. In addition, the antenna 181 receives radio waves in the air and converts the radio waves into signals. The antenna 181 may include a transmitting antenna and a receiving antenna, or may be a single antenna for transmission and reception. The antenna 181 may be a directional antenna and may include a plurality of antenna elements.

The RF circuit 183 performs analog processing on signals that are transmitted and received via the antenna 181. The RF circuit 183 may include a high-frequency filter, an amplifier, a modulator, a lowpass filter, and the like.

The network interface 185 is, for example, a network adaptor, and transmits signals to and receives signals from the network.

The processor 187 performs digital processing on signals that are transmitted and received via the antenna 181 and the RF circuit 183. The digital processing includes processing of the RAN protocol stack. The processor 187 also performs processing on signals that are transmitted and received via the network interface 185. The processor 187 may include a plurality of processors, or may be a single processor. The plurality of processors may include a baseband processor that performs the digital processing and one or more processors that perform other processing.

The memory 189 stores a program to be executed by the processor 187, parameters related to the program, and data related to the program. The memory 189 may include at least one of a read only memory (ROM), an erasable programmable read only memory (EPROM), an electrically erasable programmable read only memory (EEPROM), a random access memory (RAM), and a flash memory. All or part of the memory 189 may be included in the processor 187.

The storage 191 stores various information. The storage 191 may include at least one of a solid state drive (SSD) and a hard disc drive (HDD).

The radio communication unit 110 may be implemented by the antenna 181 and the RF circuit 183. The network communication unit 120 may be implemented by the network interface 185. The storage unit 130 may be implemented by the storage 191. The processing unit 140 may be implemented by the processor 187 and the memory 189.

Part or all of the processing unit 140 may be virtualized. In other words, part or all of the processing unit 140 may be implemented as a virtual machine. In this case, part or all of the processing unit 140 may operate as a virtual machine on a physical machine including a processor, a memory, and the like (that is, hardware) and a hypervisor.

Given the hardware configuration described above, the base station 100 may include a memory (that is, the memory 189) that stores a program and one or more processors (that is, the processor 187) capable of executing the program, and the one or more processors may be configured to execute the program to perform operations of the processing unit 140. The program may be a program for causing the processors to execute the operations of the processing unit 140.

3. Configuration of User Equipment

Figure 5:
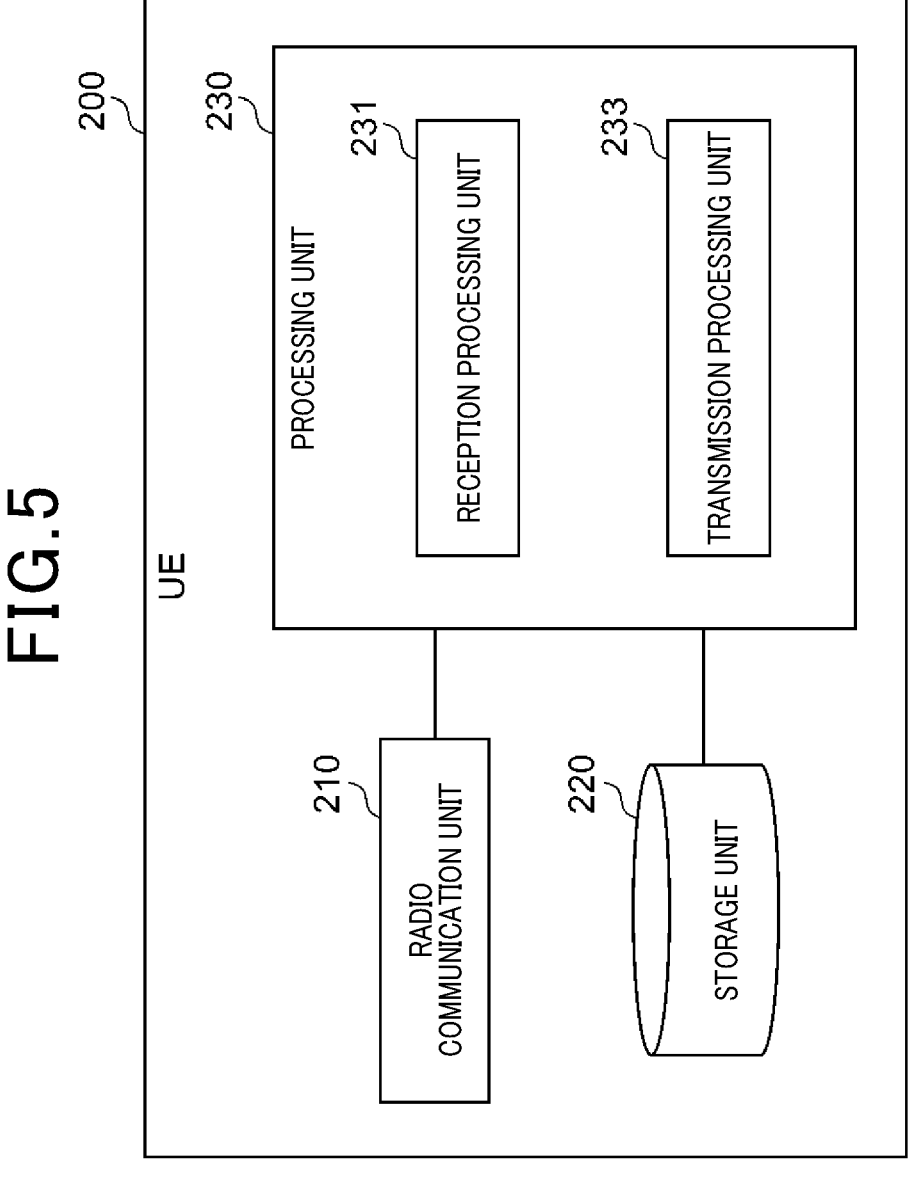
FIG. 5 is a block diagram illustrating an example of a schematic functional configuration of the user equipment according to the embodiment of the present disclosure.
Figure 6:
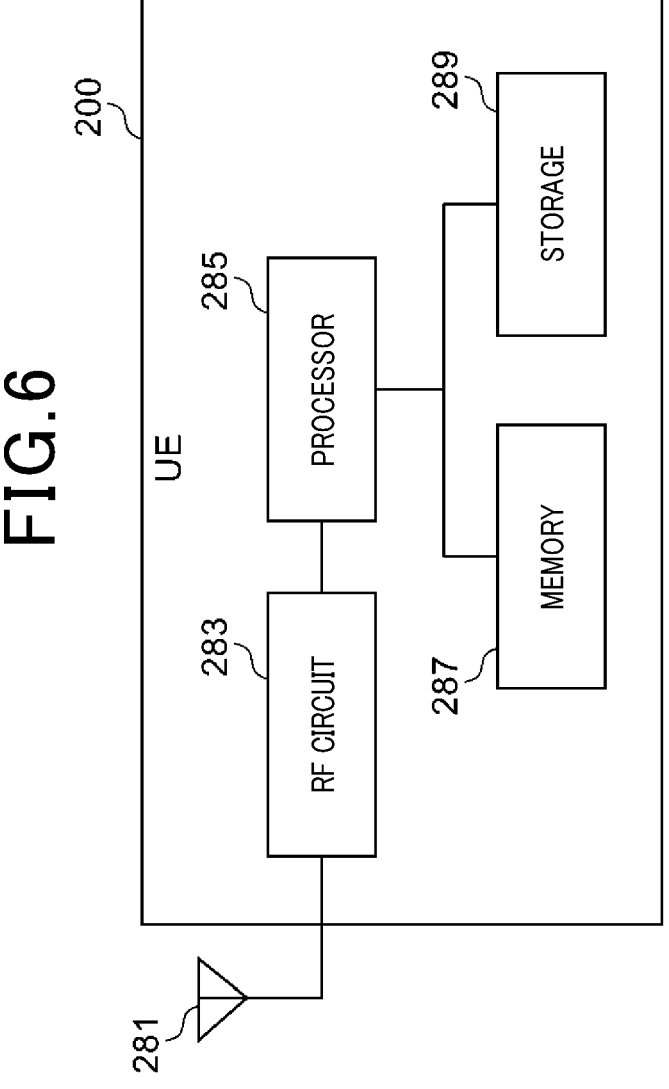
FIG. 6 is a block diagram illustrating an example of a schematic hardware configuration of the user equipment according to the embodiment of the present disclosure.

A configuration example of the UE 200 according to the embodiment of the present disclosure will be described with reference to FIGS. 5 and 6.

(1) Functional Configuration

First, a functional configuration example of the UE 200 according to the embodiment of the present disclosure will be described with reference to FIG. 5. Referring to FIG. 5, the UE 200 includes a radio communication unit 210, a storage unit 220, and a processing unit 230.

The radio communication unit 210 wirelessly transmits and receives signals. For example, the radio communication unit 210 receives signals from and transmits signals to a base station. For example, the radio communication unit 210 receives signals from and transmits signals to another UE.

The storage unit 220 stores various information.

The processing unit 230 provides various functions of the UE 200. The processing unit 230 includes a reception processing unit 231 and a transmission processing unit 233. Note that the processing unit 230 may further include a component other than these components. That is, the processing unit 230 may also perform an operation other than operations of these components. Specific operations of the reception processing unit 231 and the transmission processing unit 233 will be described in detail later.

For example, the processing unit 230 (the reception processing unit 231 and the transmission processing unit 233) communicates with a base station (for example, the base station 100 or the base station 40) or another UE via the radio communication unit 210.

(2) Hardware Configuration

Next, a hardware configuration example of the UE 200 according to the embodiment of the present disclosure will be described with reference to FIG. 6. Referring to FIG. 6, the UE 200 includes an antenna 281, an RF circuit 283, a processor 285, a memory 287, and a storage 289.

The antenna 281 converts signals into radio waves and emits the radio waves into the air. In addition, the antenna 281 receives radio waves in the air and converts the radio waves into signals. The antenna 281 may include a transmitting antenna and a receiving antenna, or may be a single antenna for transmission and reception. The antenna 281 may be a directional antenna and may include a plurality of antenna elements.

The RF circuit 283 performs analog processing on signals that are transmitted and received via the antenna 281. The RF circuit 283 may include a high-frequency filter, an amplifier, a modulator, a lowpass filter, and the like.

The processor 285 performs digital processing on signals that are transmitted and received via the antenna 281 and the RF circuit 283. The digital processing includes processing of the RAN protocol stack. The processor 285 may include a plurality of processors, or may be a single processor. The plurality of processors may include a baseband processor that performs the digital processing and one or more processors that perform other processing.

The memory 287 stores a program to be executed by the processor 285, parameters related to the program, and data related to the program. The memory 287 may include at least one of a ROM, an EPROM, an EEPROM, a RAM, and a flash memory. All or part of the memory 287 may be included in the processor 285.

The storage 289 stores various information. The storage 289 may include at least one of an SSD and an HDD.

The radio communication unit 210 may be implemented by the antenna 281 and the RF circuit 283. The storage unit 220 may be implemented by the storage 289. The processing unit 230 may be implemented by the processor 285 and the memory 287.

The processing unit 230 may be implemented by a system on chip (SoC) including the processor 285 and the memory 287. The SoC may include the RF circuit 283, and the radio communication unit 210 may also be implemented by this SoC.

Given the hardware configuration described above, the UE 200 may include a memory (that is, the memory 287) that stores a program and one or more processors (that is, the processor 285) capable of executing the program, and the one or more processors may be configured to execute the program to perform operations of the processing unit 230.

The program may be a program for causing the processors to execute the operations of the processing unit 230.

4. Configuration of Network Node

Figure 7:
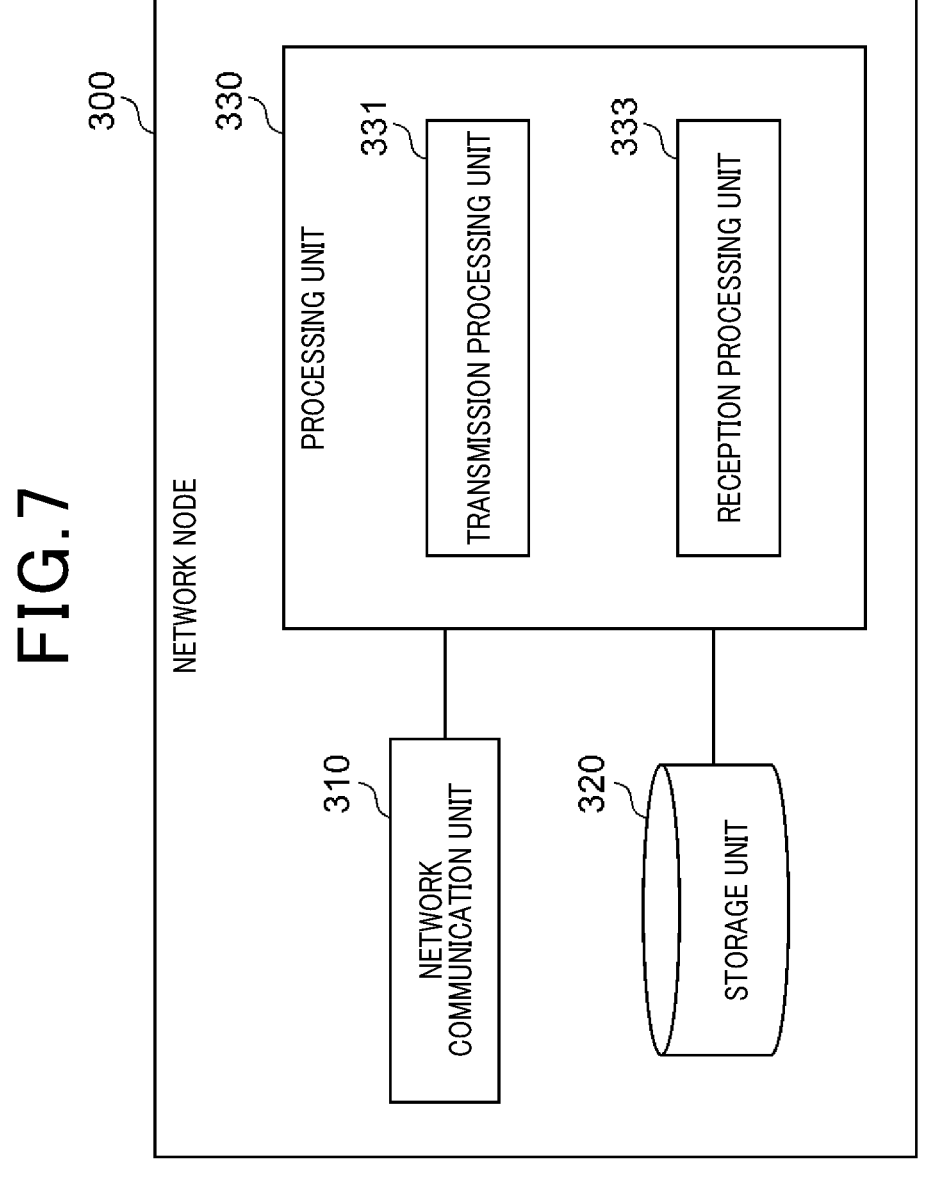
FIG. 7 is a block diagram illustrating an example of a schematic functional configuration of a network node according to the embodiment of the present disclosure.
Figure 8:
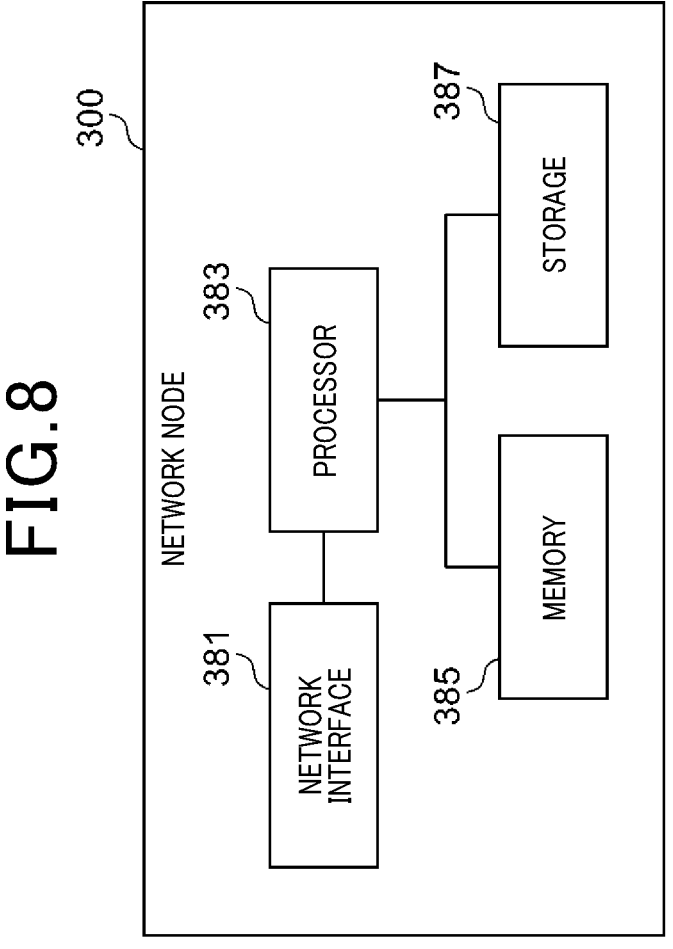
FIG. 8 is a block diagram illustrating an example of a schematic hardware configuration of the network node according to the embodiment of the present disclosure.

A configuration example of the network node 300 according to the embodiment of the present disclosure will be described with reference to FIGS. 7 and 8.

(1) Functional Configuration

First, a functional configuration example of the network node 300 according to the embodiment of the present disclosure will be described with reference to FIG. 7. Referring to FIG. 7, the network node 300 includes a network communication unit 310, a storage unit 320, and a processing unit 330.

The network communication unit 310 receives signals from and transmits signals to the network.

The storage unit 320 stores various information.

The processing unit 330 provides various functions of the network node 300. The processing unit 330 includes a transmission processing unit 331 and a reception processing unit 333. Note that the processing unit 330 may further include a component other than these components. That is, the processing unit 330 may also perform an operation other than operations of these components. Specific operations of the transmission processing unit 331 and the reception processing unit 333 will be described in detail later.

For example, the processing unit 330 (the transmission processing unit 331 and the reception processing unit 333) communicates with a base station (for example, the base station 100) via the network communication unit 310. For example, the processing unit 330 (the transmission processing unit 331 and the reception processing unit 333) communicates with a UE (for example, the UE 200) through a base station (for example, the base station 100) via the network communication unit 310.

(2) Hardware Configuration

Next, a hardware configuration example of the network node 300 according to the embodiment of the present disclosure will be described with reference to FIG. 8. Referring to FIG. 8, the network node 300 includes a network interface 381, a processor 383, a memory 385, and a storage 387.

The network interface 381 is, for example, a network adaptor, and transmits signals to and receives signals from the network.

The processor 383 performs processing on signals that are transmitted and received via the network interface 381. The processor 383 may include a plurality of processors, or may be a single processor.

The memory 385 stores a program to be executed by the processor 383, parameters related to the program, and data related to the program. The memory 385 may include at least one of a read only memory (ROM), an erasable programmable read only memory (EPROM), an electrically erasable programmable read only memory (EEPROM), a random access memory (RAM), and a flash memory. All or part of the memory 385 may be included in the processor 383.

The storage 387 stores various information. The storage 387 may include at least one of a solid state drive (SSD) and a hard disc drive (HDD).

The network communication unit 310 may be implemented by the network interface 381. The storage unit 320 may be implemented by the storage 387. The processing unit 330 may be implemented by the processor 383 and the memory 385.

Part or all of the processing unit 330 may be virtualized. In other words, part or all of the processing unit 330 may be implemented as a virtual machine. In this case, part or all of the processing unit 330 may operate as a virtual machine on a physical machine including a processor, a memory, and the like (that is, hardware) and a hypervisor.

Given the hardware configuration described above, the network node 300 may include a memory (that is, the memory 385) that stores a program and one or more processors (that is, the processor 383) capable of executing the program, and the one or more processors may be configured to execute the program to perform operations of the processing unit 330. The program may be a program for causing the processors to execute the operations of the processing unit 330.

5. Operation Examples

Operation examples of the base station 100, the UE 200, and the network node 300 according to the embodiment of the present disclosure will be described with reference to FIGS. 9 to 13.

(1) Paging

Network Node 300

The network node 300 (the transmission processing unit 331) transmits, to the base station 100, a message for a paging to the UE 200. The base station 100 (the second reception processing unit 147) receives the message from the network node 300.

For example, the message is a paging message of an NG application protocol (NGAP) layer.

For example, the message includes an ID of the UE 200. For example, the ID is 5G S-Temporary Mobile Subscriber Identity (5G-S-TMSI) of the UE 200. Further, the message includes a tracking area identity (TAI) list for a paging, a paging priority, and the like.

Base Station 100

The base station 100 (the first transmission processing unit 141) transmits a paging message. The UE 200 (the reception processing unit 231) receives the paging message.

For example, the base station 100 (the first transmission processing unit 141) transmits the paging message in response to the message transmitted by the network node 300.

For example, the paging message is a paging message of an RRC layer.

For example, the paging message includes an ID of the UE 200. More specifically, for example, the paging message includes a list of paging records, and one paging record in the list includes an ID of the UE 200. For example, the ID is 5G-S-TMSI or full Inactive Radio Network Temporary Identifier (I-RNTI) of the UE 200.

(2) Response to Paging

In the embodiment of the present disclosure in particular, the UE 200 (the transmission processing unit 233) transmits, in response to the paging message, busy information indicating that the UE 200 is busy and exceptional service information indicating a service for which a paging is exceptionally allowed.

For example, the network node 300 (the reception processing unit 333) receives the busy information and the exceptional service information.

This, for example, makes it possible to perform an important paging while reducing unnecessary pagings. That is, it is possible to stop pagings for services except for a service designated by the UE 200 and to perform a paging for the service designated by the UE 200.

NAS Message

For example, the UE 200 (the transmission processing unit 233) transmits, in response to the paging message, a non-access stratum (NAS) message including the busy information and the exceptional service information to the network node 300. The network node 300 (the reception processing unit 333) receives the NAS message. The NAS message is transmitted from the UE 200 to the network node 300 through the base station 100.

For example, the NAS message is a SERVICE REQUEST message.

Referring to the example of FIG. 9, for example, a SERVICE REQUEST message includes Service Type, 5G-S-TMSI, Allowed access categories, and the like as information elements.

This, for example, makes it possible to transmit the busy information and the exceptional service information using an existing message in the existing procedure. That is, it is possible to reduce impact on the existing structure.

Busy Information

For example, the busy information is Service Type included in the SERVICE REQUEST message, the Service Type indicating that the UE 200 is busy.

Referring again to the example of FIG. 9, a SERVICE REQUEST message includes Service Type. The Service Type is an information element for identifying a purpose of a service request procedure. For example, this Service Type indicates that the UE 200 is busy.

More specifically, referring to the example of FIG. 10, Service Type included in a SERVICE REQUEST message is a 1-octet information element, and includes 4-bit Service type IEI and 4-bit Service type value. In particular, the Service type value is a busy indication in a case where the Service type value is a predetermined value (that is, 0111). In this manner, the Service Type indicates that the UE 200 is busy.

This, for example, makes it possible to transmit busy information without adding a new information element to the existing message. That is, it is possible to considerably reduce impact on the existing structure.

Exceptional Service Information

For example, the exceptional service information indicates one or more of a plurality of access categories as the service for which a paging is exceptionally allowed. For example, each of the plurality of access categories is defined by a combination of conditions related to UE and a type of access attempt.

For example, the exceptional service information is an information element (for example, Allowed access categories) included in the SERVICE REQUEST message.

Referring to the example of FIG. 11, Allowed access categories included in a SERVICE REQUEST message includes one or more Access categories. The one or more Access categories indicate one or more of a plurality of access categories illustrated in the example of FIG. 12. As illustrated in FIG. 12, each of the plurality of access categories is defined by conditions related to UE and a type of access attempt.

Naturally, the exceptional service information is not limited to the above example. The exceptional service information may indicate another item that classifies services as the service for which a paging is exceptionally allowed. As an example, the other item may be 5G QoS identifier (5QI)

Condition of Transmission

For example, in a case where the UE 200 is communicating in the second mobile network, the UE 200 (the transmission processing unit 233) transmits the busy information and the exceptional service information in response to the paging message.

More specifically, for example, in a case where the UE 200 is communicating in the second mobile network and prioritizes communication in the second mobile network over communication in the first mobile network corresponding to the paging message, the UE 200 (the transmission processing unit 233) transmits the busy information and the exceptional service information in response to the paging message.

Referring again to FIG. 2, for example, the UE 200 is in the RRC idle state or RRC inactive state in the first mobile network including the base station 100, and is communicating with the base station 40 in the second mobile network. At this time, the UE 200 receives a paging message including an ID of the UE 200 from the base station 100. The UE 200 determines which of communication in the first mobile network corresponding to the paging message and communication in the second mobile network to prioritize (or prefer). If the UE 200 determines to prioritize (or prefer) the communication in the second mobile network, the UE 200 transmits the busy information and the exceptional service information. On the other hand, if the UE 200 determines to prioritize (or prefer) the communication in the first mobile network corresponding to the paging message, the UE 200 initiates connection establishment in the first mobile network.

This, for example, makes it possible to transmit busy information and exceptional service information only when necessary.

Note that the above-described determination by the UE 200 can also be regarded as determination of whether to initiate connection establishment in the first mobile network or transmit the busy information.

(3) Operation Based on Busy Information and Exceptional Service Information

For example, the network node 300 (the transmission processing unit 331) controls a paging to the UE 200 based on the exceptional service information.

More specifically, for example, the network node 300 (the transmission processing unit 331) transmits, to the base station 100, a message for a paging to the UE 200 for the service indicated by the exceptional service information. On the other hand, the network node 300 (the transmission processing unit 331) does not transmit a message for a paging to the UE 200 for a service not indicated by the exceptional service information.

With this, for example, unnecessary pagings to the UE 200 are reduced and an important paging to the UE 200 is performed in actuality.

(4) Flow of Processing

An example of processing according to the embodiment of the present disclosure will be described with reference to FIG. 13.

As an assumption, the UE 200 is in the RRC idle state or RRC inactive state in the first mobile network including the base station 100 and the network node 300, and is in the RRC connected state in the second mobile network including the base station 40 and is connected to the base station 40.

The network node 300 transmits, to the base station 100, a message for a paging to the UE 200 (S310). The base station 100 receives the message from the network node 300.

The base station 100 transmits a paging message in response to the message (S320). The UE 200 receives the paging message.

The UE 200 determines which of communication in the first mobile network corresponding to the paging message and communication in the second mobile network to prioritize (or prefer) (S330).

If the UE 200 prioritizes (or prefers) the communication in the second mobile network, the UE 200 transmits a NAS message including busy information and exceptional service information to the network node 300 through the base station 100 (S340). The network node 300 receives the NAS message. The busy information indicates that the UE 200 is busy, and the exceptional service information indicates a service for which a paging is exceptionally allowed.

6. Modification Examples

First and second modification examples according to the embodiment of the present disclosure will be described with reference to FIG. 14. Note that the two modification examples may be combined with each other.

(1) First Modification Example

In the above-described example of the embodiment of the present disclosure, the UE 200 (the transmission processing unit 233) transmits, in response to the paging message, a NAS message including the busy information and the exceptional service information to the network node 300. The network node 300 (the reception processing unit 333) receives the NAS message. However, the embodiment of the present disclosure are not limited to this example.

RRC Message

As a first modification example of the embodiment of the present disclosure, the UE 200 (the transmission processing unit 233) may transmit the busy information and the exceptional service information to the base station 100 in response to the paging message. The base station 100 (the first reception processing unit 143) may receive the busy information and the exceptional service information from the UE 200.

More specifically, for example, the UE 200 (the transmission processing unit 233) may transmit, in response to the paging message, an RRC message including the busy information and the exceptional service information to the base station 100. The base station 100 (the first reception processing unit 143) may receive the RRC message. The busy information and the exceptional service information may be information elements included in the RRC message, not in a NAS message.

Transmission to Network Node

The base station 100 (the second transmission processing unit 145) may transmit the busy information and the exceptional service information to the network node 300. The network node 300 (the reception processing unit 333) may receive the busy information and the exceptional service information from the base station 100.

More specifically, for example, the base station 100 (the second transmission processing unit 145) may transmit an NGAP message including the busy information and the exceptional service information to the network node 300. The network node 300 (the reception processing unit 333) may receive the NGAP message from the base station 100.

This, for example, enables the network node 300 to finally receive the busy information and the exceptional service information.

Flow of Processing

An example of processing according to the first modification example of the embodiment of the present disclosure will be described with reference to FIG. 14.

Figure 13:
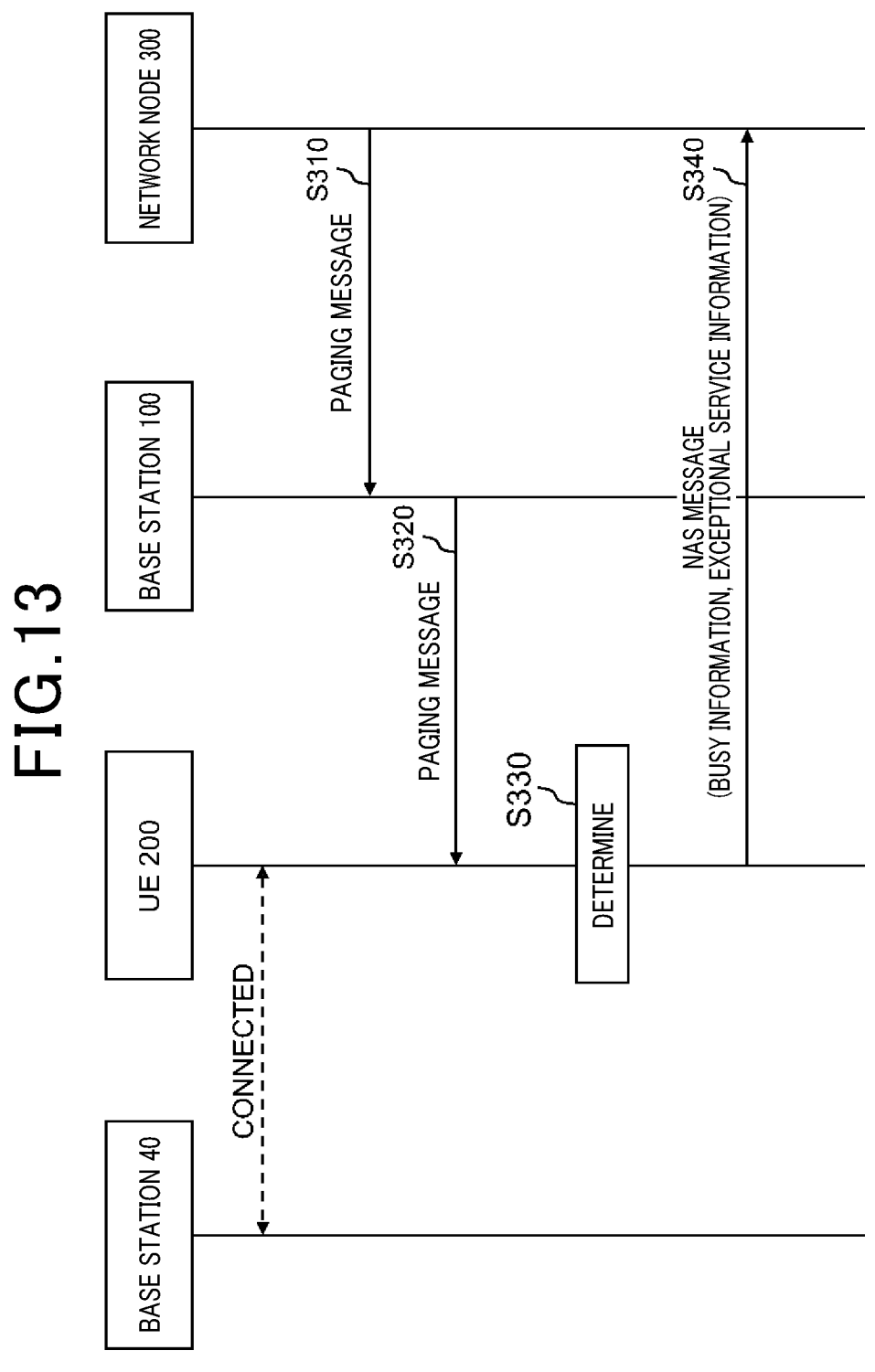
FIG. 13 is a sequence diagram for explaining an example of a schematic flow of processing according to the embodiment of the present disclosure.
Figure 14:
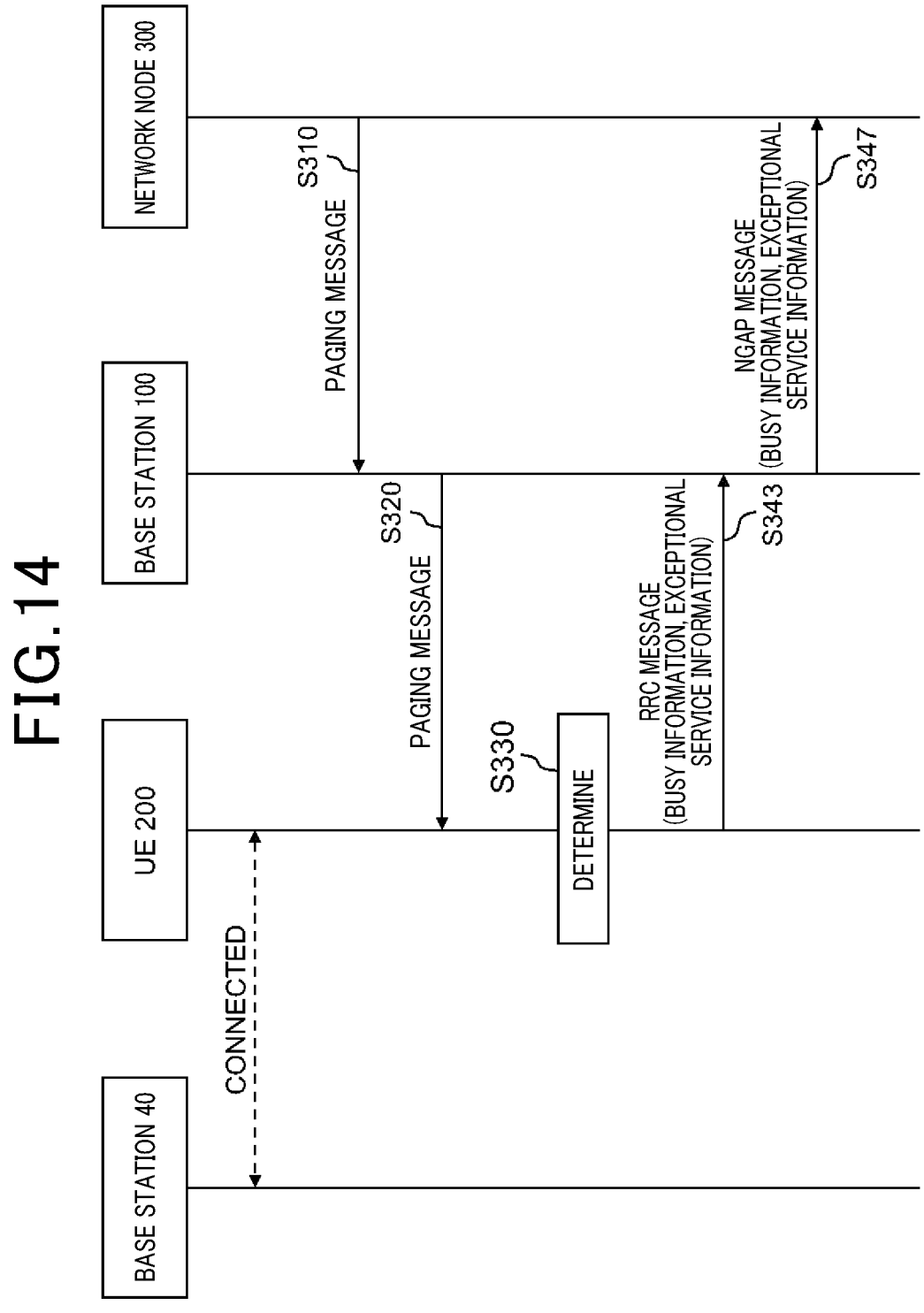
FIG. 14 is a sequence diagram for explaining an example of a schematic flow of processing according to a first modification example of the embodiment of the present disclosure.

Description of steps S310 to S330 illustrated in FIG. 14 is the same as the descriptions of the steps S310 to S330 illustrated in FIG. 13. Thus, duplicate descriptions are omitted here.

If the UE 200 prioritizes the communication in the second mobile network, the UE 200 transmits an RRC message including busy information and exceptional service information to the base station 100 (S343). The base station 100 receives the RRC message. The busy information indicates that the UE 200 is busy, and the exceptional service information indicates a service for which a paging is exceptionally allowed.

The base station 100 transmits an NGAP message including the busy information and the exceptional service information to the network node 300 (S347). The network node 300 receives the NGAP message.

(2) Second Modification Example

In the above-described example of the embodiment of the present disclosure, the system 1 is a system compliant with TSs of 5G or NR. However, the system 1 according to the embodiment of the present disclosure is not limited to this example.

The system 1 may be a system compliant with other 3GPP TSs. As an example, the system 1 may be a system compliant with TSs of long term evolution (LTE), LTE advanced (LTE-A), or 4G. In this case, the base station 100 may be an evolved node B (eNB), and the network node 300 may be a mobility management entity (MME). As yet another example, the system 1 may be a system compliant with TSs of next-generation (for example, 6G).

Alternatively, the system 1 may be a system compliant with TSs of another standardization organization for mobile communications.

While an embodiment of the present disclosure have been described above, the present disclosure is not limited to the embodiment. It will be understood by those skilled in the art that the embodiment is merely an example and various changes can be made without departing from the scope and the spirit of the present disclosure.

For example, steps in a process described in the present specification are not necessarily executed chronologically in the order described in the flowchart or sequence diagram. For example, steps in a process may be executed in an order different from the order described as the flowchart or sequence diagram, or may be executed in parallel. In addition, one or more steps in a process may be removed, or one or more further steps may be added to the process.

For example, there may be provided a method including the operations of one or more components of an apparatus described in the present specification, and there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to by another name such as mobile station, mobile terminal, mobile device, mobile unit, subscriber station, subscriber terminal, subscriber device, subscriber unit, wireless station, wireless terminal, wireless device, wireless unit, remote station, remote terminal, remote device, or remote unit.

For example, in the present disclosure, "transmit" may mean performing processing of at least one layer in a protocol stack used for transmission, or physically transmitting signals wirelessly or by wire. Alternatively, "transmit" may mean a combination of performing the processing of the at least one layer and physically transmitting signals wirelessly or by wire. Similarly, "receive" may mean performing processing of at least one layer in a protocol stack used for reception, or physically receiving signals wirelessly or by wire. Alternatively, "receive" may mean a combination of performing processing of the at least one layer and physically receiving signals wirelessly or by wire.

For example, in the present disclosure, "obtain/acquire" may mean obtaining/acquiring information from stored information, obtaining/acquiring information from information received from another node, or obtaining/acquiring information by generating the information.

For example, in the present disclosure, "include" and "comprise" do not mean that only listed items are included, but mean that only listed items may be included or a further item may be included in addition to the listed items.

For example, in the present disclosure, "or" does not mean exclusive OR but means inclusive OR.

Note that the technical features included in the above-described embodiment may be represented as the following features. Naturally, the present disclosure is not limited to the following features.

(Feature 1)

A user equipment (200) comprising:

a reception processing unit (231) configured to receive a paging message transmitted by a base station (100); and a transmission processing unit (233) configured to transmit, in response to the paging message, busy information indicating that the user equipment is busy and exceptional service information indicating a service for which a paging is exceptionally allowed.

(Feature 2)

The user equipment according to Feature 1, wherein the transmission processing unit is configured to transmit, in response to the paging message, a non-access stratum, NAS, message including the busy information and the exceptional service information to a network node (300) within a core network (30).

(Feature 3)

The user equipment according to Feature 2, wherein the NAS message is a SERVICE REQUEST message.

(Feature 4)

The user equipment according to Feature 3, wherein the busy information is Service Type included in the SERVICE REQUEST message, the Service Type indicating that the user equipment is busy.

(Feature 5)

The user equipment according to Feature 1, wherein the transmission processing unit is configured to transmit, in response to the paging message, a radio resource control, RRC, message including the busy information and the exceptional service information to the base station.

(Feature 6)

The user equipment according to any one of Features 1 to 5, wherein the exceptional service information indicates one or more of a plurality of access categories as the service.

(Feature 7)

The user equipment according to Feature 6, wherein each of the plurality of access categories is defined by a combination of conditions related to user equipment and a type of access attempt.

(Feature 8)

The user equipment according to any one of Features 1 to 7, wherein the user equipment is capable of communicating in two or more mobile networks, and the base station is included in a first mobile network of the two or more mobile networks.

(Feature 9)

The user equipment according to Feature 8, wherein the user equipment is capable of being equipped with two or more subscriber identity module, SIM, cards, and the two or more mobile networks respectively correspond to the two or more SIM cards.

(Feature 10)

The user equipment according to Feature 8 or 9, wherein the transmission processing unit is configured to transmit the busy information and the exceptional service information in response to the paging message in a case where the user equipment is communicating in a second mobile network of the two or more mobile networks.

(Feature 11)

The user equipment according to Feature 10, wherein the transmission processing unit is configured to transmit the busy information and the exceptional service information in response to the paging message in a case where the user equipment is communicating in the second mobile network and the user equipment prioritizes communication in the second mobile network over communication in the first mobile network corresponding to the paging message.

(Feature 12)

The user equipment according to any one of Features 1 to 11, wherein the paging message includes an ID of the user equipment.

(Feature 13)

A network node (300) within a core network (30), comprising:

a transmission processing unit (331) configured to transmit, to a base station (100), a message for a paging to a user equipment (200); and a reception processing unit (333) configured to receive busy information and exceptional service information transmitted by the user equipment in response to a paging message transmitted by the base station in response to the message, wherein the busy information indicates that the user equipment is busy, and the exceptional service information indicates a service for which a paging is exceptionally allowed.

(Feature 14)

The network node according to Feature 13, wherein the reception processing unit is configured to receive a NAS message transmitted by the user equipment, the NAS message including the busy information and the exceptional service information.

(Feature 15)

The network node according to Feature 13, wherein the busy information and the exceptional service information is included in an RRC message transmitted to the base station by the user equipment, and the reception processing unit is configured to receive the busy information and the exceptional service information from the base station.

(Feature 16)

The network node according to any one of Features 13 to 15, wherein the transmission processing unit is configured to control a paging to the user equipment based on the exceptional service information.

(Feature 17)

The network node according to Feature 16, wherein the transmission processing unit is configured to transmit, to the base station, a message for a paging to the user equipment for the service indicated by the exceptional service information, and not to transmit a message for a paging to the user equipment for a service not indicated by the exceptional service information.

(Feature 18)

A base station (100) comprising:

a transmission processing unit (141) configured to transmit a paging message; and a reception processing unit (143) configured to receive busy information and exceptional service information transmitted by a user equipment (200) in response to the paging message, wherein the busy information indicates that the user equipment is busy, and the exceptional service information indicates a service for which a paging is exceptionally allowed.

(Feature 19)

The base station according to Feature 18, wherein the reception processing unit is configured to receive an RRC message transmitted by the user equipment, the RRC message including the busy information and the exceptional service information.

(Feature 20)

The base station according to Feature 18 or 19, further comprising a further transmission processing unit (145) configured to transmit the busy information and the exceptional service information to a network node (300) within a core network (30).

(Feature 21)

The base station according to any one of Features 18 to 20, further comprising:

a further reception processing unit (147) configured to receive, from a network node within a core network, a message for a paging to a user equipment, wherein the transmission processing unit is configured to transmit the paging message in response to the message.

(Feature 22)

A method performed by a user equipment (200), comprising:

receiving a paging message transmitted by a base station (100); and transmitting, in response to the paging message, busy information indicating that the user equipment is busy and exceptional service information indicating a service for which a paging is exceptionally allowed.

(Feature 23)

A method performed by a network node (300) within a core network (30), comprising:

transmitting, to a base station (100), a message for a paging to a user equipment (200); and receiving busy information and exceptional service information transmitted by the user equipment in response to a paging message transmitted by the base station in response to the message, wherein the busy information indicates that the user equipment is busy, and the exceptional service information indicates a service for which a paging is exceptionally allowed.

(Feature 24)

A method performed by a base station (100), comprising:

transmitting a paging message; and receiving busy information and exceptional service information transmitted by a user equipment (200) in response to the paging message, wherein the busy information indicates that the user equipment is busy, and the exceptional service information indicates a service for which a paging is exceptionally allowed.

(Feature 25)

A program that causes a computer to execute:

receiving a paging message transmitted by a base station (100); and transmitting, in response to the paging message, busy information indicating that a user equipment (200) is busy and exceptional service information indicating a service for which a paging is exceptionally allowed.

(Feature 26)

A program that causes a computer to execute:

transmitting, to a base station (100), a message for a paging to a user equipment (200); and receiving busy information and exceptional service information transmitted by the user equipment in response to a paging message transmitted by the base station in response to the message, wherein the busy information indicates that the user equipment is busy, and the exceptional service information indicates a service for which a paging is exceptionally allowed.

(Feature 27)

A program that causes a computer to execute:

transmitting a paging message; and receiving busy information and exceptional service information transmitted by a user equipment (200) in response to the paging message, wherein the busy information indicates that the user equipment is busy, and the exceptional service information indicates a service for which paging is exceptionally allowed.

(Feature 28)

A non-transitory tangible computer-readable storage medium having stored therein a program that causes a computer to execute:

receiving a paging message transmitted by a base station (100); and transmitting, in response to the paging message, busy information indicating that a user equipment (200) is busy and exceptional service information indicating a service for which a paging is exceptionally allowed.

(Feature 29)

A non-transitory tangible computer-readable storage medium having stored therein a program that causes a computer to execute:

transmitting, to a base station (100), a message for a paging to a user equipment (200); and receiving busy information and exceptional service information transmitted by the user equipment in response to a paging message transmitted by the base station in response to the message, wherein the busy information indicates that the user equipment is busy, and the exceptional service information indicates a service for which paging is exceptionally allowed.

(Feature 30)

A non-transitory tangible computer-readable storage medium having stored therein a program that causes a computer to execute:

transmitting a paging message; and receiving busy information and exceptional service information transmitted by a user equipment (200) in response to the paging message, wherein the busy information indicates that the user equipment is busy, and the exceptional service information indicates a service for which a paging is exceptionally allowed.

What is claimed is:

1. A user equipment which communicates with a plurality of mobile networks using a plurality of subscriber identity modules, comprising:

a memory storing a program; and one or more processors configured to execute the program to:

receive a paging message from a first mobile network;

transmit in response to the paging message, to an Access and Mobility Management Function (AMF) in the first mobile network, a SERVICE REQUEST message including a first information element and a second information element in a case where the user equipment determines to not accept to receive the paging message from the first mobile network, the first information element indicating that the user equipment does not accept to receive the paging message from the first mobile network, the second information element indicating that the paging message is not transmitted from the first mobile network except for a voice service; and receive, from the first mobile network, the paging message only for the voice service in a case where the first information element and the second information element are transmitted.

2. The user equipment according to claim 1, wherein the user equipment does not perform connection establishment with the first mobile network in a case where the user equipment determines to transmit the first information element.

3. The user equipment according to claim 1, wherein the SERVICE REQUEST message is a non-access stratum (NAS) message.

4. The user equipment according to claim 1, wherein the paging message includes an ID of the user equipment.

5. An Access and Mobility Management Function (AMF) in a first mobile network, comprising:

a memory storing a program; and one or more processors configured to execute the program to:

transmit, to a base station, a paging message to a user equipment which communicates with a plurality of mobile networks using a plurality of subscriber identity modules;

receive, from the user equipment, a SERVICE REQUEST message including a first information element and a second information element, the first information element indicating that the user equipment does not accept to receive the paging message from the first mobile network, the second information element indicating that the paging message is not transmitted except for a voice service; and transmit, to the base station, the paging message only for the voice service in a case where the first information element and the second information element are received.

6. The AMF according to claim 5, wherein the SERVICE REQUEST message is a non-access stratum (NAS) message.

7. The AMF according to claim 5, wherein the paging message includes an ID of the user equipment.

8. A base station comprising:
a memory storing a program; and
one or more processors configured to execute the program to:
    transmit a paging message to a user equipment which communicates with a plurality of mobile networks using a plurality of subscriber identity modules;
    receive in response to the paging message, a SERVICE REQUEST message including a first information element and a second information element, the first information element indicating that the user equipment does not accept to receive the paging message from a first mobile network, the second information element indicating that the paging message is not transmitted from the first mobile network except for a voice service; and
    transmit a non-access stratum (NAS) message to an Access and Mobility Management Function (AMF) in the first mobile network.

9. The base station according to claim 8, wherein the SERVICE REQUEST message is a NAS message.

10. The base station according to claim 8, wherein the paging message includes an ID of the user equipment.

\* \* \* \* \*